Nov. 9, 1948.  F. C. MOCK  2,453,651
CONTROL FOR INTERNAL-COMBUSTION ENGINES
Filed April 27, 1942  3 Sheets-Sheet 1

INVENTOR
FRANK C. MOCK
BY
ATTORNEY

Nov. 9, 1948.  F. C. MOCK  2,453,651
CONTROL FOR INTERNAL-COMBUSTION ENGINES
Filed April 27, 1942  3 Sheets-Sheet 2

INVENTOR
FRANK C. MOCK
BY A. R. McCrady
ATTORNEY

Nov. 9, 1948. F. C. MOCK 2,453,651
CONTROL FOR INTERNAL-COMBUSTION ENGINES
Filed April 27, 1942 3 Sheets-Sheet 3

INVENTOR
FRANK C. MOCK
BY A. R. McCrady
ATTORNEY

Patented Nov. 9, 1948

2,453,651

UNITED STATES PATENT OFFICE 2,453,651

CONTROL FOR INTERNAL-COMBUSTION ENGINES

Frank C. Mock, South Bend, Ind., assignor to Bendix Aviation Corporation, South Bend, Ind., a corporation of Delaware Application April 27, 1942, Serial No. 440,669

42 Claims. (Cl. 170—135.6)

This invention relates to controls for internal combustion engines and more particularly to boost and power controls for limiting the charging pressure and developed horsepower of an aircraft engine.

Superchargers for aircraft engines are generally capable of maintaining maximum permissible charging pressures up to some predetermined altitude, and below this altitude the engine must be throttled, or the effective supercharger output otherwise controlled, to prevent overcharging and possible resulting damage to the engine. A device generally referred to as a boost control is commonly provided for this purpose, and usually operates to automatically regulate or limit the throttle opening to prevent overcharging. Such a control may be either of the constant datum type, in which the maximum permissible charging pressure is constant, or of the variable datum type, in which the permissible charging pressure is varied either by change in the position of the pilot's control lever, or by variations in altitude, or by some other variable.

With some boost controls, the throttle is directly controlled by the pilot's lever and the boost control merely limits the throttle opening the pilot can obtain. In others, the throttle is automatically controlled by a boost control and but indirectly by the pilot's control lever. In the present invention, the throttle is directly controlled by the pilot at low charging pressures corresponding to idling and operation at very light loads, and is automatically controlled by a boost control of the variable datum type at higher charging pressures.

Heretofore, boost controls have utilized a complexity of external linkages, causing installation difficulties because of extensive space requirements, and causing operating difficulties because of wear and other factors resulting from vibration. The present invention, however, provides a very compact boost control which is substantially free of adverse effects resulting from vibration. In addition, a novel anti-hunt or damping device is provided to eliminate the objectionable hunting action which is generally present in a boost control.

In addition to controlling or limiting the engine charging pressure, it is desirable to also control or limit the horsepower developed by the engine to prevent overheating or other adverse effects resulting from excessive power output. Both functions are performed by the boost control if the engine speed is constant, since the charging pressure, being an approximate measure of the engine torque, is also a measure of the engine horsepower. With engines having controllable pitch propellers whereby the engine speed may be varied, the engine speed should also be controlled and correlated with the charging pressure so that both the charging pressure and the engine horsepower are prevented from exceeding the maximum safe permissible values. According to the present invention, a single lever is provided in the pilot's compartment which sets the boost control datum, thereby determining the operating charging pressure, and also sets a propeller pitch governor, which varies the propeller pitch so as to maintain a selected engine speed. With the arrangement of the instant invention, any desired correlation of charging pressure and engine speed can be readily obtained. The combined control of charging pressure and engine speed consequently determines the power output.

At altitudes above critical altitude for a given position of the pilot's control lever, at which time the supercharger is unable to maintain the desired charging pressure even though the throttle is in the wide open position, it is desirable to be able to further increase the engine speed beyond that utilized when the charging pressure is being maintained, to at least partially compensate for the loss in power resulting from the decreased charging pressure. For this purpose a novel tripping device is provided whereby the propeller pitch may be varied to increase the engine speed when the throttle is in the wide open position.

It is accordingly an object of the invention to provide an improved power control for an internal combustion engine.

Another object of the invention is to provide a joint control of the charging pressure of the engine and the pitch of the propeller for correlating the power output and charging pressure of the engine.

A further object of the invention is to provide a correlated charging pressure and propeller pitch control in which the propeller pitch may be further varied to increase the engine speed when the throttle reaches wide open position.

A further object of the invention is to provide a correlated charging pressure and propeller pitch control having an emergency override for increasing the permissible charging pressure and/or engine speed beyond the normal maximum values.

Another object of the invention is to provide an improved boost control for limiting the charging pressure of the engine.

Another object of the invention is to provide an improved engine throttle control in which the throttle is directly controlled by the pilot through a part of the throttle opening range and indirectly controlled by the pilot through a boost control through the balance of the throttle opening range.

Another object of the invention is to provide a very compact boost control having small space requirements and adapted to withstand engine vibrations.

A further object of the invention is to provide a boost control having an improved damping or anti-hunt device for eliminating hunting tendencies of the control.

A still further object is to provide an improved propeller pitch control for an aircraft engine.

Another object of the invention is to provide a simplified pilot's control for an aircraft engine.

Other objects and advantages of the invention will be readily apparent from the following description taken in connection with the appended drawings in which.

Figure 1:
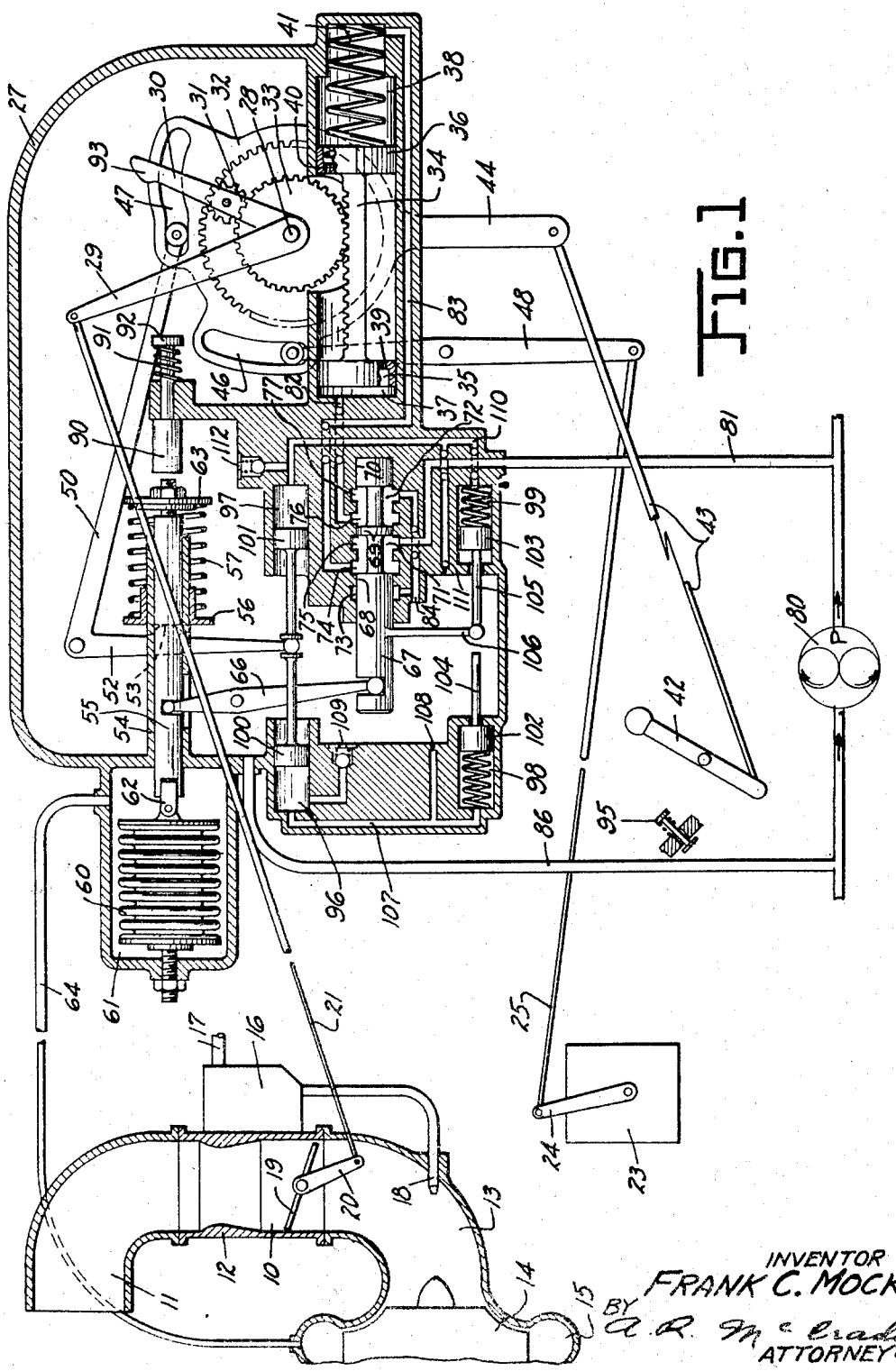
Figure 1 is a diagrammatic sectional view of the invention.
Figure 2:
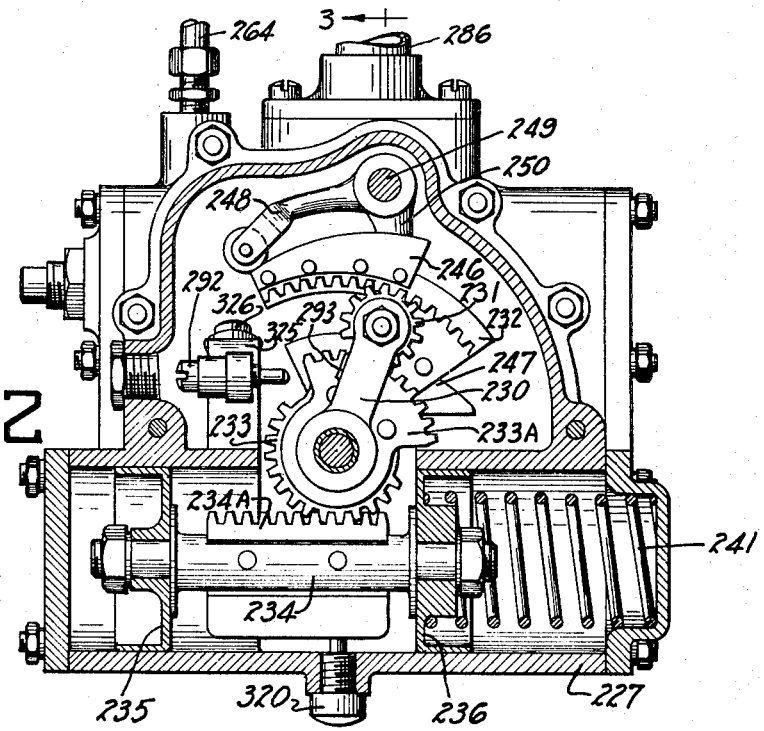
Figure 2 is a sectional view of a preferred embodiment of the invention taken on the line 2—2 of Figure 3.

With particular reference to Figure 1, there is shown an induction passage 10 for an internal combustion engine having an air inlet 11, a venturi 12, and a section 13 leading to the entrance of a supercharger 14 having an annular discharge ring 15 from which the individual cylinders of the engine are supplied. Fuel may be supplied to the engine by any desired fuel feeding system, such for example as a carburetor 16 of the pressure feed type disclosed in Patent No. 2,447,261, filed October 24, 1940, patented July 19, 1948, which receives fuel through a pipe 17 and discharges it through a nozzle 18. The supercharger may be positioned either after the carburetor, as shown, or before the carburetor; or, two superchargers may be used positioned as desired with reference to the carburetor. Also, the superchargers may be of either the single speed or multi-speed type.

A throttle 19 variably limits the quantity of air flowing through the induction passage to the cylinders of the engine and is controlled through a lever 20 and a link 21 by mechanism hereinafter described. A propeller pitch governor, indicated generally at 23, controls the pitch of the propeller (not shown) to maintain the engine speed at a value determined by the position of a rod or lever 24, the latter being controlled through a link 25 by mechanism hereinafter described. The propeller pitch control may be of either the electric, hydraulic, or any other known type.

A power control, consisting of a combined boost control and propeller pitch control, includes a main casing 27 having a main shaft 28 rotatably mounted therein. A lever 29 is secured to the shaft 28 exteriorly of the casing and is pivotally connected to the link 21. A second lever 30 having a spur gear pinion 31 pivotally mounted thereon is also secured to the shaft 28 whereby rotation of lever 30 rotates lever 29 and variably positions the throttle 19. A member 32 having an internal tooth gear segment in mesh with the pinion 31 is rotatable relative to the shaft 28 and may either be loosely mounted thereon or otherwise supported to rotate about the axis of the shaft 28. A gear 33, rotatably mounted relative to the shaft 28, is in engagement with the pinion 31 and with a gear rack 34 forming a connection between two servo-motor pistons 35 and 36 slidably received in cylinders 37 and 38 and provided with small oil by-pass ports 39 and 40. A spring 41 urges the pistons to the left corresponding to closed throttle position. Although the gear 33 is diagrammatically illustrated as a conventional gear, if desired it may be a member having two separate and distinct gear segments, one meshing with the pinion 31 and the other with the rack 34. The gears 31, 32 and 33 form a conventional planetary spur gear train wherein counterclockwise movement of either or both of gears 32 and 33 rotates the lever 30, shaft 28 and lever 29 in a counterclockwise direction and opens the throttle 19. Similarly, clockwise movement of the gears closes the throttle.

For controlling the power output of the engine, the pilot is provided with a pivotally mounted control lever 42 mounted in the pilot's compartment which is connected by a link 43 with an arm 44 on the member 32, whereby the pilot controls directly the position of the member 32. The member 32 is provided with a pair of cam surfaces 46 and 47 for respectively varying the engine speed and the datum of the boost or charging pressure control. The cam 46 is engaged by a roller or other type of follower on a pivoted lever 48 which is connected to the link 25 for varying the setting of the propeller pitch governor 23 to thereby vary the engine speed. The cam 47 is engaged by a roller or other type of follower on one arm 50 of a pivoted bell crank, the other arm 52 of which is provided with fingers 53 straddling a cylindrical guide 54 of a datum rod 55 and engaging a spring collar 56 slidably mounted on the guide 54 for variably loading a boost control datum spring 57.

A sealed evacuated corrugated bellows 60 is adjustably mounted at its left end in the wall of a chamber 61 and has its free end secured through a universal connection 62 to the left end of the rod 55. The spring 57 prevents the evacuated bellows from collapsing by reacting against a spring retaining member 63 threadedly received on the rod 55 and locked in its adjusted position by a conventional lock-nut or other known means. The bellows 60 is subjected to engine charging pressure by means of the pressure transmitting pipe 64 connecting the chamber 61 to the induction passage posterior to the supercharger.

Movement of rod 55 is transmitted through a pivoted lever 66 to a servo-motor control valve 67 provided with lands 68, 69, 70 and grooves 71, 72. The valve is slidably received in a cylinder having grooves 73, 74, 75, 76 and 77. The right-hand end of the cylinder may be vented to the interior of casing 27 to prevent damping action of valve 67. The land 69 is somewhat narrower than the groove 75 and in the neutral position of the valve is substantially centrally located relative to the said groove. In this position of the valve the lands 68 and 70 just, or very nearly, seal the grooves 73 and 77. Although as shown the servo-valve 67 is of a particular construction, it will be apparent that other types of servo-valves may readily be substituted.

A pump 80, which may either be the main oil pump for the engine or a pump for an auxiliary hydraulic system, supplies oil through a pipe 81 to the groove 75 of the servo-valve cylinder. Any source of motivating fluid could be used in place of the pump 80. Ducts 82 and 83 lead from the grooves 76 and 74 to the left and right-hand chambers 37 and 38 of the servo-motor respectively, and a duct 84 connects grooves 73 and 77 with the interior of casing 27. A pipe 86 returns oil from the casing to the pump 80.

The operation of the device so far described is as follows: At sea level with the throttle closed and the engine idling the various parts will occupy substantially the positions shown in Figure 1, at which time the knob of control lever 42 is to the extreme right, the cam followers of levers 48 and 50 are in engagement with the low portion of cams 46 and 47, and the fingers 53 of lever 52 are in substantially their most left-hand position whereby the spring 57 is loaded with but a moderate force which preferably is insufficient to prevent partial collapse of the bellows 60 notwithstanding the fact that the pressure in the engine manifold and in chamber 61 is relatively low during idling. As a consequence, the lever 66 is in its extreme counterclockwise position and the valve 67 is to the extreme right. Oil under pressure from pump 80 is transmitted through pipe 81, servo-valve groove 71, and duct 83 to the servo-motor chamber 38 where it acts on piston 36 and, together with the spring 41, holds the rack 34 in its extreme left-hand position, thus substantially locking the gear 33.

If the knob of lever 42 is gradually moved to the left the member 32 will move in a counterclockwise direction causing the pinion 31 to move in a similar direction around the gear 33. This movement of the pinion is transmitted through lever 30, shaft 28 and lever 29 to the throttle link 21, thereby opening the throttle. As the throttle opens the charging pressure acting on bellows 60 increases and tends to maintain the bellows in its collapsed state; however, as lever 42 is moved, the rise in cam 47 approaches and engages the roller follower of lever 50 thereby moving the fingers 53 to the right to increase the load on spring 57 tending to expand bellows 60. The abrupt rise in cam 47 increases the spring load at a rate greater than the rate of increase of the pressure collapsing force resulting from manual opening of the throttle, whereby the spring force overcomes the pressure force and moves the rod 55 to the right and, through lever 66, moves the servo-valve 67 to the left until the valve reaches its normal equilibrium position in which the land 69 is substantially centered relative to the groove 75. At this time the throttle is partially open and the engine is operating at a speed and load greater than those corresponding to idling but preferably less than the minimum values experienced during cruising. Through this range of movement of lever 42, to be referred to as the range of direct throttle actuation, the pilot has a direct mechanical control of the throttle, the boost control being substantially inoperative. It may be noted, however, that if the boost control remained inoperative, as by failure in the oil supply to the boost control or in cold weather before the oil has warmed up, movement of lever 42 to its extreme left-hand position would mechanically open the throttle an additional amount, preferably to a position at least sufficient to maintain cruising operation, but insufficient to exceed the maximum permissible charging pressure.

If the knob of lever 42 is now moved an additional amount to the left beyond the normal range of direct throttle actuation, the cam 47 rotates levers 50 and 52 an additional amount whereby the fingers 53 further load spring 57 and move the rod 55 to the right and the servo-valve 67 to the left from their neutral or equilibrium positions. The oil supply passage 81 is thus communicated through servo-valve groove 72 with the duct 82 leading to chamber 37; and chamber 38 is communicated through passage 83 and groove 71 with the passage 84 for returning oil to the casing 27. The high pressure oil forces piston 35 and rack 34 to the right against spring 41 thereby rotating gear 33 in a counterclockwise direction, causing pinion 31, lever 30, shaft 28 and lever 29 to also move in a counterclockwise direction thereby opening the throttle 19 until the engine manifold pressure transmitted to chamber 61 becomes sufficiently great to collapse the bellows 60 and move the servo-valve 67 to its equilibrium position. During operation above the direct manually controlled throttle range hereinabove described, the pilot, in moving lever 42 and the cam 47 on the associated member 32, determines the load on spring 57 and therefore determines the manifold or engine charging pressure which the boost control will maintain. For example, if at a given setting of lever 42, the charging pressure decreases as by increase in altitude, the bellows 60 will expand slightly causing the servo-valve 67 to move to the left to increase the flow of oil to the servo-motor chamber 37, thereby moving the piston 35 further to the right and opening the throttle an additional amount so as to maintain the selected operating charging pressure. An increase in charging pressure, as by decrease in altitude will produce the reverse effect and result in a slight closing of the throttle. Ports 39 and 40 are provided in pistons 35 and 36 to insure circulation of oil so that it will not freeze and lock the control at low temperatures, such as are experienced at high altitudes. It will be apparent that if desired, the servo-motor could be of a type supplying oil only to chamber 37 and not to chamber 38, in which case only the spring 41 would be relied upon to move the rack 34 to the left.

The pilot's control lever 42, in positioning the member 32, also determines the propeller pitch governor setting by means of the cam 46. Upon movement of the knob of lever 42 to the left, the cam 46 rotates lever 48 in a counterclockwise direction and moves link 25 and lever 24 to the right, thereby changing the propeller pitch governor setting to correspond to a higher governed engine speed. The correlated control of charging pressure, by means of cam 47, and engine speed, by means of cam 46, thus provides a power control. Although the cams 46 and 47 are shown with particular profiles, it will be readily apparent that the profiles may be independently varied to produce any desired correlation between the position of lever 42, the selected charging pressure and the setting of the propeller pitch governor. For example, if it is desired to use a fixed propeller pitch governor setting through a portion of the range of movement of lever 42, cam 46 may be provided with a circular cam profile through that range. Likewise, if it is desired to provide the pilot with a fine regulation of the charging pressure through a particular range of movement of lever 42, the cam 47 may be made to but very gradually change through this range; or if the initial manually controlled range of throttle movement is to be enlarged or diminished, the sudden rise in cam 47 may obviously occur later or earlier in the cam profile. In this latter connection it may be noted that it is undesirable to eliminate the initial manually controlled range since the engine manifold pressure at idling and near idling tends to be unstable and would result in excessive hunting action of the control. Also, in the majority of engines the manifold pressure decreases as the throttle is closed toward a near idling position and then tends to increase as it is moved from the near idling position to the idling position, the latter resulting primarily from valve overlap. As a consequence of this reversal in the trend of manifold pressure, the boost control, if it were operating through the idling to near idling range of throttle movement, would actuate the throttle in the direction opposite of that required to compensate for a change in manifold pressure. It is therefore considered desirable to provide only manual control of the throttle up to a throttle opening at which the manifold pressure is not only stable, but has reached its minimum value and started to increase.

At altitudes above the critical altitude for a given setting of lever 42, the latter corresponding to the altitude at which the desired charging pressure can just be maintained with the throttle wide open, the servo-valve 67 will be to the left and full oil line pressure will be admitted to chamber 37 in an effort to further open the throttle so as to maintain the desired charging pressure. With the throttle against the wide open stop, not shown, additional counterclockwise movement of the levers 29 and 30 is prevented and as a consequence, the oil pressure on piston 35 would move rack 34 to the right, rotating pinion 31 on its pivot thereby forcing member 32 in a clockwise direction and moving lever 42 toward closed position against the frictional force normally preventing change in position of lever 42. Such action would continue until the reduced charging pressure required by the unchanged position of member 32 and cam 47 could be obtained or until the servo-piston 36 was against its stop. In addition, such action would change the position of cam 46 and consequently the engine speed setting. To prevent this obviously undesirable action, I provide a novel servo-motor tripping device comprising a slidably mounted movable stop 90 urged to the right by a spring 91 and having a flange 92 adapted to be engaged by the rounded cam-like portion 93 of the lever 30 as the lever 30 approaches within a few degrees of its wide open throttle position. Movement of stop 90 upon further movement of the lever 30 toward its wide open throttle position moves rod 55 to the left and valve 67 to the right, or progressively limits their permissible movement to thereby increasingly restrict and to finally cut off communication through servo-valve 67 between the oil supply passage 81 and the duct 82 leading to the servo-motor chamber 37. During operation above a critical altitude the lever 30 and throttle 19 will open to the point at which the stop 90 has moved the land 69 of servo-valve 67 to a restricting position in which the flow of oil to servo-motor chamber 37 is just sufficient to balance the force of spring 41 and retain the piston 35 and rack 34 in their desired intermediate position.

The pilot is thus able to move lever 42 from a given position to the left to increase the engine speed, by means of cam 46, so as to increase the engine power output, even though the supercharger is unable to maintain the charging pressure corresponding to the said given position. Such movement of lever 42 rotates member 32 which tends to move the pinion 31 and lever 30 toward fully open position and therefore moves stop 90 a slight additional amount to the left to more highly restrict or cut off the flow of oil to chamber 37. In response to the decreased oil pressure in chamber 37 the spring 41 moves the rack 34 to the left to permit pinion 31 to rotate on its axis in response to the movement of the member 32 without appreciably changing the position of lever 30.

In some installations an override feature is desired whereby for emergency operation the pilot is able to raise either the permissible charging pressure, or the engine speed, or both, to a value or values somewhat higher than normally permitted or desired. For this purpose a spring loaded stop 95 is provided which normally limits the permissible power increasing movement of lever 42; however, during an emergency the pilot can overcome the force of the spring stop and move the lever 42 an additional amount. The end portions of cams 46 and 47, corresponding to the emergency positions of lever 42, can be given any desired configuration to increase the charging pressure and/or engine speed any desired amount.

In order to prevent undue hunting action of the boost control, a novel damping means is provided comprising two pairs of oppositely disposed cylinders 96, 97 and 98, 99. A pair of pistons 100, 101 connected to each other and to the end of lever 52 are slidably received in cylinders 96, 97. Spring loaded pistons 102, 103 are slidably received in cylinders 98, 99 and have inwardly projecting rod-like extensions 104, 105 adapted to closely approach the rounded or ball-like end of an arm 106 of the servo-valve 67 when the valve is in its central or normal position, at which time the pistons 102, 103 are urged to their most inwardly positions by their respective relatively light springs. Cylinders 96 and 98 are interconnected by a passage 107 and are connected to the interior of casing 27 through a restricted passage 108 and through a pressure relief passage controlled by a spring-loaded pressure relief valve 109. In a similar manner the cylinders 97 and 99 are interconnected by a passage 110 and are connected to the interior of casing 27 by a restricted connection 111 and a pressure relief passage controlled by a spring-loaded pressure relief valve 112.

During operation, if the servo-valve 67 tends to hunt, or to move to the left and right about its equilibrium position thereby successively opening and closing the throttle about its desired position, the arm 106 of servo-valve 67 will successively engage rods 104 of piston 102 and 105 of piston 103 which will resist movement of the valve either to the left or right from its equilibrium position. Thus the arm 106 cannot move to the left of its equilibrium position any faster than the oil is forced out of the restricted passage 108 by the piston 102. The arm 106 can then move freely to the right to its equilibrium position, during which time the piston 102 returns to its original position somewhat more slowly than the arm 106 because of the restricted inflow of oil to cylinder 98. The rod 105 and piston 103 similarly snub movement of the arm 106 to the right of its equilibrium position. It will be noted that each piston snubs movement of arm 106 away from the equilibrium position but does not apply any force to the arm during its return movement which otherwise would tend to make the arm carry beyond its equilibrium position. Effective anti-hunt or damping action is thus obtained.

When the control lever 42 is moved it is desirable for the servo-valve 67 to quickly respond and at such times the resisting effect of the pistons 102 and 103 should preferably be eliminated. To accomplish this end, the pistons 100, 101 are provided which upon movement resulting directly from movement of lever 42, through member 32 and levers 50, 52, displace oil and temporarily withdraw whichever of pistons 102 or 103 would interfere with the desired rapid movement of valve 67. If, for example, the lever 42 is suddenly moved to the left to increase the charging pressure, the lever 52 will rotate counterclockwise and move pistons 100 and 101 to the right. Piston 101 merely forces oil out of cylinder 97 through the relief valve 112; however, piston 100 draws oil out of cylinder 98 which moves piston 102 to the left against the small force of its spring. Rod 104 is thus withdrawn temporarily, permitting valve 67 to move freely to the left to increase the supply of oil to chamber 37 whereby the throttle is further opened as desired. Sudden movement of lever 42 to the right forces pistons 100, 101 to the left thereby forcing oil through relief valve 109 and withdrawing piston 103 to permit free movement of valve 67 to the right to close the throttle as desired.

Figures 2-6 are views of a preferred embodiment of the control diagrammatically illustrated in Figure 1, in which parts corresponding to parts of Figure 1 have been given corresponding reference numerals with the addition of 200. In this embodiment a lever 229, adapted to be connected to the engine or carburetor throttle, is secured to a rotatably mounted hollow shaft-like extension 228 of a lever 230 on which a pinion 231 is pivotally mounted. A lever 244, adapted to be connected to the pilot's control lever, is secured to a rotatable shaft 245 extending through the hollow extension 228 and having an internal toothed gear segment 232 secured thereto to be rotated by lever 244. The pinion 231 is in engagement with the gear segment 232 and with a gear segment 233A riveted to a member 233 rotatably mounted on shaft 228 and provided with gear teeth engaging with a gear rack member 234A secured to a member 234. Pistons 235 and 236 are secured to the ends of member 234 and the assembly is urged to the left by a spring 241. A screw 320 is threaded into the bottom of the casing 227 and has a rod-like extension 321 received within a slot 322 to prevent the piston assembly from rotating. Cams 246 and 247, for varying the propeller pitch and the boost control datum respectively, are secured, as by riveting, to the member 232.

A lever 248, provided with a roller follower in engagement with cam 246, is pinned or otherwise secured to a shaft 249 rotatably mounted in the casing 227 and provided at its outboard end with a lever 248A secured thereto which is adapted to be connected to the control rod or lever of a propeller pitch governor. A member 251, rotatably mounted on shaft 249, is provided with an arm 250 having a roller follower in engagement with the cam 247. The member 251 is also provided with a pair of finger-like projections 253 engaging a collar 256.

Figure 4:
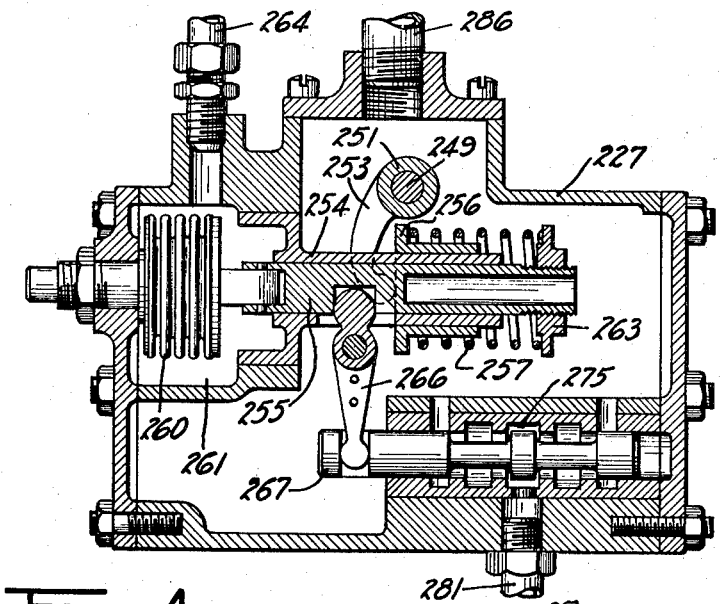
Figure 4 is a sectional view of the invention taken on the line 4—4 of Figure 3.

As best shown in Figure 4, the collar 256 is slidably received on a guide 254 of a datum rod 255, the latter being connected to a sylphon 260 adjustably mounted in a chamber 261 connected to the engine manifold by a pipe 264. The sylphon 260 is loaded by a spring 257 variably compressed by the fingers 253 between the collar 256 and an adjustable spring retainer 263 threadedly received on the datum rod 255. Varying the position of the datum rod 255 actuates a control valve 267 of a servo-motor through a pivoted lever 266 in the same manner as previously described in connection with Figure 1. Springs, not shown, are preferably provided for maintaining the roller followers of levers 248 and 250 in constant engagement with their respective cams.

Figure 3:
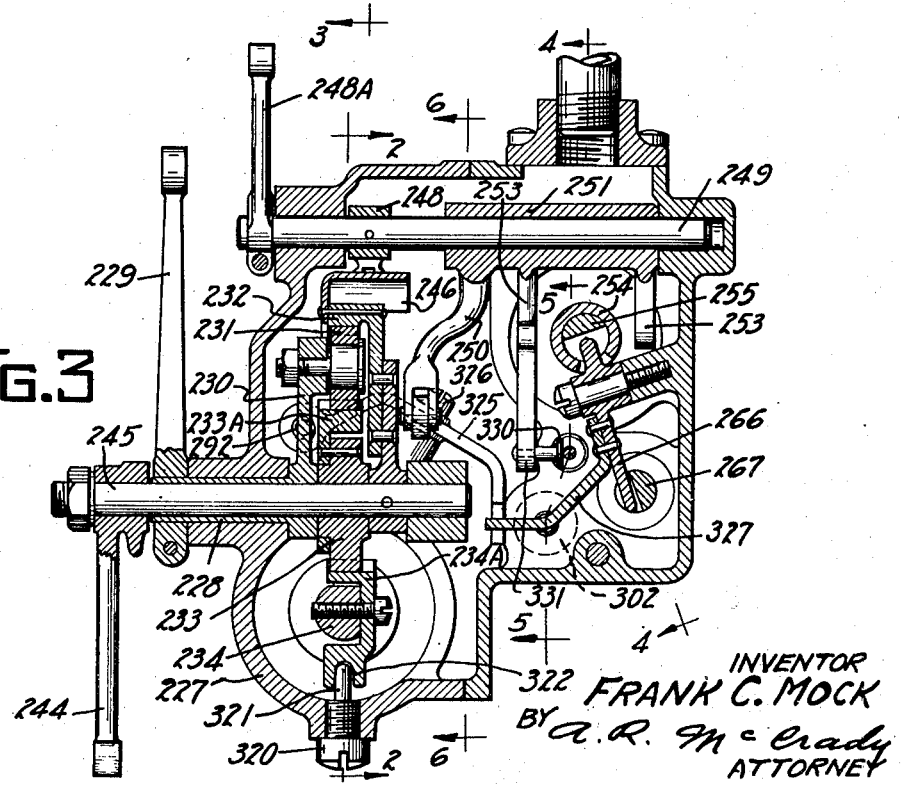
Figure 3 is a sectional view of the invention taken on the line 3—3 of Figure 2.

In order to trip the servo-motor when the throttle reaches wide open position, as was described in connection with Figure 1, a pad 293 is provided in the lever 230 which is adapted to engage the end of an adjustable screw 292 mounted on one end of a lever 325 pivotally received on a stud 326. The other end of lever 325 is provided with a lateral extension adapted to engage a member 327 riveted to and extending from the pivoted lever 266, as is best shown in Figure 3. Thus, when the throttle actuating lever 230 approaches within a few degrees of its wide open position the pad 293 engages the screw 292 of lever 325 and through extension 327 of lever 266 forces the servo-valve 267 to the right, as shown in Figure 4, to decrease the supply of oil to the piston 235 as explained in connection with Figure 1.

Figure 5:
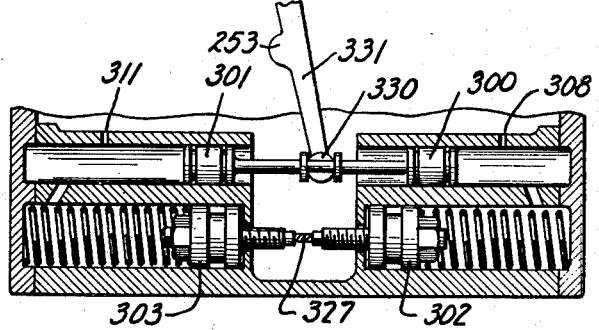
Figure 5 is a partial view in section taken on the line 5—5 of Figure 3 and showing the anti-hunt device.
Figure 6:
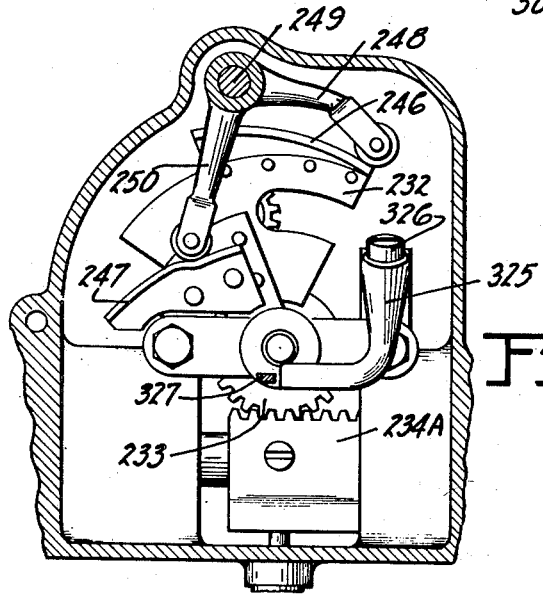
Figure 6 is a partial view in section taken on the line 6—6 of Figure 3 and showing the cam and followers for varying the datum of the boost control and for controlling the propeller pitch governor.

The anti-hunt device partially disclosed in Figure 5 is similar to the one diagrammatically illustrated in Figure 1 and need be but briefly described, it being noted, however, that due to the difference in the direction from which the views are taken, the parts of Figure 5 are reversed from left to right in comparison with Figure 1. The dashpot pistons 302 and 303 resist hunting movement of the servo-piston 267 by resisting the movement of the extension 327 of the servo-piston actuating lever 266. Upon movement of the lever 244 the snubbing action of pistons 302 and 303 is eliminated by the movement of pistons 300 and 301 which are actuated by a disk 330 secured to an extension 331 of the left-hand finger 253, as shown in Figure 3, the finger 253 being moved by lever 250 and cam 247 upon movement of lever 244. As with the device of Figure 1, movement of pistons 300 and 301 will withdraw one of the pistons 302, 303 to permit free movement of the servo-valve 267. Pressure relief valves such as valves 109 and 112 of Figure 1 may be provided if desired; however, the forceful and positive movement of pistons 300 and 301 can in many cases force the trapped oil through the restricted connection 308 or 311 at a rate sufficiently rapid that the use of pressure relief valves is unnecessary.

Oil is supplied to the center groove 275 of the servo-valve cylinder by a pipe 281 receiving oil under pressure either from the main engine oil system or from an auxiliary hydraulic system. A pipe 286 leads from the top of the casing 227 for returning oil either to the main engine oil pump or the pump of the auxiliary hydraulic system.

In the modification of Figures 2-6 it is contemplated that the casing 227 will be entirely filled with oil in contrast to the device of Figure 1 in which the casing 27 may be but partly filled with oil.

Although the invention has been described with reference to the particular embodiments disclosed in the drawings, it will be apparent that many changes or rearrangements of the parts may be made without departing from the spirit of the invention. For example, with reference to Figure 1, it will be apparent that movement of the arm 30 and gears 32 and 33 are so related that the movement of any two of the members jointly determines the movement of the third member, such that any one of the three could be connected to the throttle, another could be controlled by the pilot's control lever and the third controlled by the boost control servo-motor. Thus, for example, the pilot's lever 42 could be arranged to control the gear 33 engaging with the pinion 31 and the rack to cooperate with a gear segment added to the member 32. Furthermore, although an oil type of servo-motor is disclosed, other types would also be suitable, such for example as one using compressed air or one of the electric type. Many other modifications will likewise be apparent to one skilled in the art from the foregoing description taken in connection with the appended drawings, and it should therefore be understood that the invention is not to be limited to the particular modifications disclosed nor otherwise except in accordance with the terms of the appended claims.

I claim:

1. In a control for an internal combustion engine throttle, a pinion rotatably mounted on a movable member, a pair of independently movable toothed members in engagement with said pinion, means connecting one of said members to the throttle, manually operable means for actuating another of said members, power means gear connected to the third of said members, and additional means interconnecting said manually operable means and said power means.

2. A control for the throttle of an internal combustion engine comprising a planetary spur gear train having an internal spur gear member, an external spur gear member, and a pinion member between and in mesh with said gears; a control lever for actuating one of said members; means connecting another of said members to the throttle; means including a gear rack responsive to variations in the charging pressure of the engine for actuating the third of said members; and means interconnecting the control lever and the charging pressure responsive means for varying the datum setting of the latter.

3. A control for the throttle of an internal combustion engine comprising a planetary gear train having concentrically mounted and relatively rotatable internal and external spur gear members, a member rotatable about the axis of said gears, and a spur gear pinion pivotally mounted on the last named member and in mesh with both of said gears; a connection from one of said members to the throttle; manual means for actuating another of said members; power means gear connected to the third of said members and including an element responsive to variations in the charging pressure of the engine; and means interconnecting said manual means and the charging pressure responsive element for varying the setting of the latter.

4. Control mechanism for use with an internal combustion engine having a throttle, including a rotatable member having internal spur gear teeth, a second rotatable member coaxial with said first member and provided with external spur gear teeth, a pivoted spur gear pinion in mesh with the teeth of said members, the pivot of said pinion being rotatable about the axis of said members, a gear rack, gear teeth on one of said members engaging said rack, a servo-motor for actuating said rack, means including an element responsive to variations in engine charging pressure controlling the servo-motor, means for manually actuating the other of said members, and means connecting the pivot of said pinion to the throttle.

5. A control for an internal combustion engine comprising a throttle, manual means for actuating the throttle, power means for actuating the throttle, means responsive to variations in the charging pressure of the engine for controlling the power means, and means for reducing the throttle actuating force of the power means as the throttle approaches a predetermined open position.

6. In a control for an internal combustion engine, a throttle, means for manually actuating the throttle, a servo-motor having a fluid actuated member for operating the throttle, a control element movable in opposite directions in response to a variable condition for controlling the flow of fluid to the member to open or close the throttle, and means moving with the throttle and becoming operative only as the throttle approaches wide open position for moving the control element toward its throttle closing position.

7. A control for the throttle of an internal combustion engine comprising a planetary gear train having an internal, an external, and pinion gear members, means connecting the pinion gear member to the throttle, manual means for actuating another of the gear members and power means for actuating the third gear member, said power means comprising a fluid actuated rack member, an element movable in response to variations in the engine charging pressure controlling the rack member and means for moving the element toward its throttle closing position as the throttle approaches a substantially open position.

8. A control for an internal combustion engine throttle, comprising manual means for actuating the throttle, power means for actuating the throttle, variable datum means responsive to variations in the charging pressure of the engine for controlling the power means, a member actuated by the manual means for varying the setting of the variable datum means, and means controlled by the manual means for rendering the power means inoperative at ground level with the throttle substantially closed whereby the throttle is solely actuated by the manual means during idling and near idling operation.

9. A throttle control for an internal combustion engine comprising a manually operable control element connected to the throttle, a variable datum charging pressure control for opening the throttle an amount in addition to that determined by the control element, and means controlled in accordance with the position of said element for rendering the charging pressure control inoperative at sea level when the control element is near its closed throttle position.

10. In a control for an internal combustion engine throttle, manual means for opening the throttle, power means for opening the throttle, and means operated by the manual means for rendering the power means inoperative during idling and near idling operation of the engine.

11. A throttle control for an internal combustion engine comprising a variable datum charging pressure control for operating the throttle, a manually actuated element operatively connected to the throttle, and means actuated by the element for varying the datum of the charging pressure control and arranged to select a datum pressure less than the charging pressure at idling when the element is in the engine idling position whereby the throttle is controlled solely by the manually actuated element through the initial throttle opening range.

12. A throttle control for an internal combustion engine comprising a manually operable control element connected to the throttle and so arranged that full movement of the element but partially opens the throttle, a variable datum charging pressure control for further opening the throttle, and means operated by the manually operable control member for varying the datum of the charging pressure control, the last named means being so constructed and arranged that as the control element approaches its throttle closed position the datum pressure is less than that corresponding to the throttle opening determined by the control element whereby the throttle is under the sole control of the manually operable control element.

13. A control for an internal combustion engine having a throttle comprising a manually operable member for opening the throttle, power means for opening the throttle an amount in addition to that determined by the manually operable member, an evacuated capsule subjected to engine charging pressure, a spring resisting collapse of said capsule, an element actuated by said capsule and spring for controlling the power means, and a connection between the manually operable member and the spring for varying the spring load, said connection and spring being so constructed and arranged as to render the power means inoperative through the initial range of throttle opening movement of the manually operable member.

14. In a control for an aircraft having an engine provided with a throttle and a variable pitch propeller, an engine speed responsive propeller pitch control means, an element for varying the setting of the control means to thereby control the engine speed; a power control for the throttle including an evacuated capsule having a wall movable in response to variations in engine charging pressure, a spring yieldingly resisting movement of said wall and power means controlled by the capsule and having an operative connection with the throttle through differential gear mechanism; and manually operated means for simultaneously varying the position of said element and the resisting force of said spring, said latter means including a rotatable member operatively connected to said spring and said element and also having an operative connection with the throttle through said differential gear mechanism.

15. A control for an aircraft engine having a variable pitch propeller comprising a throttle for controlling the air supply to the engine, an engine speed responsive propeller pitch control means, an element for varying the setting of the control means to thereby control the engine speed, and a power control comprising a planetary gear train having an external gear member, an internal gear member, a pinion in mesh with said gear members, and a pinion supporting member, means connecting one of said members to the throttle, means including a spring loaded evacuated capsule responsive to variations in the charging pressure for actuating another of said members, manually operable means for actuating the third of said members, and means actuated by the manually operable means for varying the load of said spring and the setting of the control element.

16. In an aircraft engine having a propeller pitch governor including a control element and a throttle controlled induction passage: the combination therewith of a planetary gear train having an internal gear member, an external gear member, and a pinion in mesh with said gear members and pivotally mounted on a rotatable member; means connecting the rotatable member to the throttle; power means for actuating one of the gear members including a gear rack, a servo-motor for actuating the rack and having a control element, a sealed chamber having a movable wall responsive to variations in pressure in the induction passage connected to the servo-motor control element, and a spring resisting movement of the wall in one direction; manually operable means for actuating the other of said gear members; and cam and follower connections between the manually operable means and the governor control element and between the manually operable means and the spring.

17. Control mechanism adapted for use within an internal combustion engine having a throttle including: a planetary gear train comprising an internal gear, an external gear, a pivoted lever, and a pinion pivotally mounted on the lever and in mesh with said gears; means for connecting the lever to the throttle; manually operated means for varying the position of one of said gears; a fluid actuated member for varying the position of the other of said gears; a valve controlling the flow of motivating fluid to the fluid actuated member; a pressure sensitive element responsive to variations in charging pressure controlling said valve; a pair of oppositely disposed dashpot pistons respectively resisting movement of the valve in opposite directions from its equilibrium position; and means actuated by the manually operated means for temporarily withdrawing one of the pistons to permit free movement of the valve upon movement of the manually operated means.

18. Control mechanism adapted for use with an internal combustion engine having a throttle, including: a servo-motor for varying the position of the throttle, control means for the servo-motor including an element actuated by a bellows responsive to the engine charging pressure, and an anti-hunt device comprising a pair of oppositely disposed chambers having movable walls abuttingly related to the control means for resisting movement of the element in opposite directions from its equilibrium position, a second pair of chambers respectively in communication with the first pair of chambers, movable walls closing said second pair of chambers to form two substantially closed hydraulic systems, and means for actuating at least one of said last named movable walls to withdraw one of the first named movable walls to permit free movement of the element in one direction from its equilibrium position.

19. In a control for an engine throttle, a pressure sensitive element movable in opposite directions for opening and closing the throttle, and an anti-hunt device comprising a pair of spaced cylinders oppositely disposed relative to the element and each having a restricted connection with a source of fluid, a pair of movable walls in the cylinders, means resiliently urging said walls into substantially abutting relation with said element when the latter is in equilibrium position, an additional pair of movable walls in fluid communication with said cylinders, and means for actuating at least one of said last-named walls for withdrawing one of said first-named walls to permit free movement of the element.

20. In a control for an engine throttle, a pressure sensitive element movable in opposite directions for opening and closing the throttle, an anti-hunt device comprising a pair of oppositely disposed cylinders, dashpot pistons in said cylinders urged toward each other by relatively weak springs, a member connected to the movable element and positioned between the pistons in substantially abutting relation therewith when the element is in its normal equilibrium position, restricted flow connections from each cylinder to a source of fluid, the relative arrangement of said flow connections and springs being such that each piston resists movement of said element in one direction from its equilibrium position but is without effect as the element returns to such position, a movable wall in fluid communication with each of said cylinders, and means for actuating at least one of said walls to withdraw one of said pistons from said member to permit free movement of the member toward the piston so withdrawn.

21. A device for preventing hunting of an element movable in opposite directions, comprising a pair of spaced cylinders oppositely disposed relative to the element and each having a restricted connection with a source of fluid, a pair of movable walls in the cylinders, means resiliently urging said walls in opposite directions into substantially abutting relation with said element when the latter is in equilibrium position, an additional pair of movable walls in fluid communication with said cylinders, and means for actuating at least one of said last-named walls for withdrawing one of said first-named walls to permit free movement of the element.

22. In a control for an aircraft engine having a variable pitch propeller and a throttle, a variable datum boost control including a servo-motor for controlling the throttle to thereby control the charging pressure of the engine, an engine speed responsive propeller pitch control means, an element for varying the setting of the control means to thereby vary the engine speed, manually operated means for simultaneously varying the datum of the boost control and the setting of the control element, and a member actuated by the throttle and connected to the servo-motor for rendering the servo-motor less effective when the throttle reaches wide open position to permit further change in the control element setting.

23. In a control for an aircraft engine having a throttle-controlled air intake and a variable pitch propeller, a variable datum boost control including a servo-motor of the fluid pressure type operatively connected to the throttle and provided with a control valve, a propeller pitch governor and a control element therefor for varying engine speed, manually operated means for simultaneously adjusting the boost control datum and said control element, and a member actuated by the throttle and connected to the control valve for actuating the control valve in a throttle closing direction as the throttle approaches wide open position thereby to permit further change in the control element setting by said manually operated means irrespective of throttle position.

24. A control adapted for use with a throttle controlled supercharged aircraft engine comprising a casing, a hollow shaft rotatably mounted in the casing and projecting therefrom, a second shaft rotatable within the hollow shaft, a manually operated member connected to one of said shafts, means connecting the other shaft to the throttle, a lever within the casing secured to said other shaft, a pinion pivotally mounted on the lever, a pair of gear segments within the casing in mesh with the pinion, one of said segments being secured to the said one shaft, a servo-motor including a fluid operated member for actuating the other of said segments, and means including a valve responsive to variations in engine charging pressure for controlling the flow of motivating fluid to the fluid operated member.

25. The invention defined in claim 24 comprising in addition a spring resisting movement of said valve in one direction and a connection from the said one shaft to the spring for varying the spring load.

26. The invention defined in claim 24 comprising in addition a connection between the lever and the valve becoming operative as the lever approaches the wide open throttle position for urging the valve toward its throttle closing position.

27. In a control for an internal combustion engine throttle, a gear rotatably mounted on a movable member, a pair of independently movable toothed members in engagement with said gear, means connecting one of said members to the throttle, manually operable means for actuating another of said members, a gear rack for actuating the third of said members, a variable datum means responsive to the charging pressure of the engine for actuating said gear rack, and means actuated by said manually operable means for varying the datum of said variable datum means.

28. In a control for an internal combustion engine throttle, a gear rotatably mounted on a movable member, a pair of independently movable toothed members in engagement with said gear, means connecting one of said members to the throttle, a power operated gear rack for actuating another of said members, a variable datum means responsive to the charging pressure of the engine for controlling said gear rack, and manually operable means for actuating the third of said members and for varying the datum of the charging pressure responsive means.

29. In a control for an internal combustion engine throttle and a propeller pitch governor control element, a gear rotatably mounted on a movable member, a pair of independently movable toothed members in engagement with said gear, means connecting one of said members to the throttle, manually operable means for actuating another of said members, power means for actuating the third of said members, and means operably connecting said manually operable means and the propeller pitch governor control element.

30. In a control for an internal combustion engine throttle, a gear rotatably mounted on a movable member, a pair of independently movable toothed members in engagement with said gear, means connecting one of said members to the throttle, manual means for actuating another of said members, power means for actuating the third of said members, and means becoming operative when the throttle approaches wide open position for controlling the power means.

31. In a control for an internal combustion engine throttle and a propeller pitch governor control element, a gear rotatably mounted on a movable member, a pair of independently movable toothed members in engagement with said gear, means connecting one of said members to the throttle, manually operable means connected to another of said members and to said control element, power means for actuating the third of said members, means responsive to engine charging pressure for controlling the power means, and means becoming operative as the throttle approaches wide open position for modifying the last named control.

32. In a control for an internal combustion engine throttle, manually operable means for actuating the throttle, a servo-motor including a power member and a control member for actuating the throttle in response to variations in a condition, means connecting the power member to the throttle, pressure responsive means for varying the position of the control member, and means moving with the throttle and operative only when the throttle is in its substantially wide open position for varying the position of the control member.

33. In a control for an internal combustion engine throttle, a servo-motor including a power member and a control member, means connecting the power member to the throttle, means responsive to engine charging pressure for varying the position of the control member, and means dependent upon throttle position for varying the position of the control member when the throttle reaches a predetermined position.

34. In a control for an internal combustion engine throttle: manual means for actuating the throttle, power means for actuating the throttle comprising a servo-motor having a power member connected to the throttle and a control member, means responsive to engine charging pressure for varying the position of said control member, and means dependent upon throttle position for limiting the position of the control member when the throttle reaches a predetermined position.

35. A device for preventing hunting of an element movable in opposite directions, comprising a pair of spaced cylinders oppositely disposed relative to the element and each having a restricted connection with a source of fluid, a pair of pistons in said cylinders urged in opposite directions by relatively light springs, means moving with each piston adapted to substantially abut said element when the latter is in equilibrium position and resist hunting movement of the element, an additional pair of cylinders in fluid communication with said first-named cylinders, pistons in said latter cylinders, and means for actuating said latter pistons to exert a withdrawing action on said first-named pistons when the said element is operatively moved in opposite directions.

36. A throttle control, comprising, in combination, condition responsive means for automatically adjusting said throttle, manual control means for adjusting said automatic means, means for limiting the adjustment of said throttle by said automatic means, said manual control means arranged for the adjustment of said throttle without interference from said limiting means, said limiting means including a first member operably connected to said throttle and adjustably positioned in response to movement of said throttle, and a second member actuated by said first member at a predetermined position of said throttle to render said automatic means inoperative for adjusting said throttle.

37. A throttle control, comprising, in combination, condition responsive means for automatically adjusting said throttle, manual control means, means for adjusting said condition responsive means, first means operably connecting said adjusting means and said manual control means, second means operably connecting said throttle and said manual control means, and third means controlled by said second means for limiting the adjustment of said throttle by said automatic means, said manual control means arranged for adjusting said throttle through said second means without interference from said third means, said third means including a first member operably connected to said throttle and adjustably positioned in response to movement of said throttle, and a second member actuated by said first member at a predetermined position of said throttle to render said automatic means inoperative for adjusting said throttle.

38. A throttle control, comprising, in combination, engine manifold pressure responsive means for automatically adjusting said throttle, manual control means for adjusting said manifold pressure responsive means, stop means, means for actuating said stop means from an inoperative to an operative relation, said stop means in said operative relation limiting the adjustment of said throttle by said automatic means, and connecting means arranged for the adjustment of said throttle by said manual control means without interference from said stop means, and said actuating means operably connected to said connecting means for actuating said stop means into said operating relation upon a predetermined adjustment of said throttle.

39. A throttle control, comprising, in combination, condition responsive means for automatically adjusting said throttle, manual control means for adjusting said automatic means, stop means, means operably connected to said manual control means for actuating said stop means, means connecting said actuating means to said throttle, said stop means limiting the adjustment of said throttle by said automatic means, said connecting means causing movement of said stop means into said limiting relation at a predetermined position of said throttle, and said manual control means arranged for independently adjusting said throttle free of said stop means.

40. A throttle control, comprising, in combination, an intake manifold pressure responsive means, a shaft driven by said pressure responsive means, said shaft operably connected to said throttle for adjusting the same, first adjustable means limiting the maximum opening of said throttle by said pressure responsive means, second adjustable means limiting the minimum opening of said throttle by said pressure responsive means, and manually operable means connected to said shaft for opening and closing said throttle free of said limiting means, whereby said throttle may be fully opened and closed under control of said manually operable means.

41. A throttle control for internal combustion aircraft engines, comprising, in combination, a control lever, an induction throttle valve, means connecting said control lever to said throttle valve, a hydraulic motor means for adjustably positioning said connecting means so as to vary the position of said throttle, a control valve for said hydraulic motor means, pressure responsive means for regulating said control valve so as to position said motor means in accordance with the intake manifold pressure of said engine, releasable stop means, and actuatable means for positioning said stop means in such a manner as to limit the movement of said control valve so as to prevent said motor means from adjusting said throttle valve past a predetermined position, said connecting means being arranged so as to permit said control lever to adjust said throttle valve past said predetermined position.

42. A device of the character described, comprising, in combination, an element for operating a control device, a manually operable member for adjusting said element, condition responsive means for adjusting said element, first means adjustably positioned in response to movement of said element, second means actuated by said first means to render said condition responsive means inoperative for adjusting said element, and said manually operable member being arranged so as to effect independent adjustment of said element during the inoperation of said condition responsive means.

FRANK C. MOCK.

REFERENCES CITED

The following references are of record in the file of this patent:

UNITED STATES PATENTS

| Number | Name | Date |
|---|---|---|
| 631,146 | Batchelor | Aug. 15, 1899 |
| 1,263,108 | Randall | Apr. 16, 1918 |
| 1,540,870 | Adams | June 9, 1925 |
| 1,585,170 | Roucha | May 18, 1926 |
| 1,743,959 | Dunstan | Jan. 14, 1930 |
| 1,788,429 | Groble | Jan. 13, 1931 |
| 1,801,587 | Chryst | Apr. 21, 1931 |
| 1,833,908 | Maybach | Dec. 1, 1931 |
| 1,924,377 | Pontow | Aug. 29, 1933 |
| 1,990,814 | Castro | Feb. 12, 1935 |
| 1,995,800 | Dodson | Mar. 26, 1935 |
| 2,023,650 | Sneed | Dec. 10, 1935 |
| 2,049,689 | Christman | Aug. 4, 1936 |
| 2,079,958 | Dodson | May 11, 1937 |
| 2,088,954 | Gregg | Aug. 3, 1937 |
| 2,187,120 | Gosslau et al. | Jan. 16, 1940 |
| 2,189,475 | Saur | Feb. 6, 1940 |
| 2,205,354 | Gregg | June 18, 1940 |
| 2,217,364 | Halford et al. | Oct. 8, 1940 |
| 2,224,600 | Howard | Dec. 10, 1940 |
| 2,228,239 | Ammann | Jan. 14, 1941 |
| 2,233,307 | Dodson | Feb. 25, 1941 |
| 2,233,319 | Lozivit | Feb. 25, 1941 |
| 2,243,627 | Gregg | May 27, 1941 |
| 2,248,780 | Pierce | July 8, 1941 |
| 2,266,784 | Matteucci | Dec. 23, 1941 |
| 2,285,344 | Marples et al. | June 2, 1942 |
| 2,330,650 | Weiche | Sept. 28, 1943 |

FOREIGN PATENTS

| Number | Country | Date |
|---|---|---|
| 447,830 | Great Britain | May 22, 1936 |
| 475,329 | Great Britain | May 21, 1937 |
| 707,704 | France | Apr. 20, 1931 |
| 790,123 | France | Sept. 2, 1935 |